US012660831B1

(12) United States Patent
Crisosto et al.

(10) Patent No.: US 12,660,831 B1
(45) Date of Patent: Jun. 23, 2026

(54) CATALYZED CARBON DIOXIDE ORGANIC RELEASE SYSTEM FOR PREVENTING SPOILAGE IN POSTHARVEST CROPS AND RELATED METHODS

(71) Applicants: Carlos Crisosto, Pismo Beach, CA (US); Gayle Crisosto, Pismo Beach, CA (US); Curtis Granger, Truckee, CA (US)

(72) Inventors: Carlos Crisosto, Pismo Beach, CA (US); Gayle Crisosto, Pismo Beach, CA (US); Curtis Granger, Truckee, CA (US)

(*) Notice: Subject to any disclaimer, the term of this patent is extended or adjusted under 35 U.S.C. 154(b) by 0 days.

(21) Appl. No.: 19/203,771

(22) Filed: May 9, 2025

Related U.S. Application Data

(60) Provisional application No. 63/793,617, filed on Apr. 24, 2025.

(51) Int. Cl.
*A23B 7/157* (2006.01)
*A23B 7/154* (2006.01)

(52) U.S. Cl.
CPC .............. *A23B 7/157* (2013.01); *A23B 7/154* (2013.01)

(58) Field of Classification Search
CPC ...................................................... A23B 7/154
See application file for complete search history.

(56) References Cited

U.S. PATENT DOCUMENTS

| | | | | |
|---|---|---|---|---|
| 6,447,826 | B1 * | 9/2002 | Matthews | A23B 4/16 426/396 |
| 2008/0085346 | A1 | 4/2008 | Kravitz et al. | |
| 2020/0101010 | A1 | 4/2020 | Felice et al. | |
| 2023/0046266 | A1 * | 2/2023 | Bowden | A23B 7/16 |

FOREIGN PATENT DOCUMENTS

| | | | | |
|---|---|---|---|---|
| AU | 2024227410 | A1 | 11/2024 | |
| CN | 103976017 | A | 8/2014 | |
| CN | 104450307 | A | 3/2015 | |
| CN | 105062702 | A | 11/2015 | |
| CN | 105454411 | A | 4/2016 | |
| CN | 106190653 | A | 12/2016 | |
| CN | 108850141 | A | 11/2018 | |
| CN | 110916043 | A | 3/2020 | |
| CN | 113563984 | A | 10/2021 | |
| CN | 113678884 | A | 11/2021 | |
| CN | 113678886 | A | 11/2021 | |
| ES | 2719235 | T3 | 7/2019 | |
| WO | 1994018831 | A1 | 9/1994 | |
| WO | WO-2025062241 | A1 * | 3/2025 | B65D 81/24 |

OTHER PUBLICATIONS

European Food and Safety Authority, EFSA Joural 2013, 11 (14): 3152.*
Zhang et al. (Effect of high oxygen and high carbon dioxide atmosphere packaging on the microbial spoilage and shelf-life of fresh-cut honeydew melon), International Journal of Food Microbiology, 166 (2013) 378-390.*
Serna-Escolano, Vicente et al.—Effect of Preharvest Treatments with Sodium Bicarbonate and Potassium Silicate in Navel and Valencia Oranges to Control Fungal Decay and Maintain Quality Traits during Cold Storage—Agronomy 2023, 13, 2925; https://doi.org/10.3390/agronomy13122925.
Rani, Karina et al.—The development of Moringa leaves effervescent granules with effervescent agent of citric acid and sodium bicarbonate—Pharmaciana vol. 11, No. 2 July p. 225-238, Journal homepage: http://journal.uad.ac.id/index.php/PHARMACIANA; DOI: 10.12928/pharmaciana.v1112.20873.
"Lyousfi, Nadia et al.—Evaluating Food Additives Based on Organic and Inorganic Salts as Antifungal Agents against Monilinia fructigena and Maintaining Postharvest Quality of Apple Fruit—J. Fungi 2023, 9, 762; https://doi.org/10.3390/jof9070762".
Ratnayake et al.—Effect of GRAS compounds on Aspergillus rot of wood-apple (*Feronia limonia*)—Phytoparasitica (2009) 37:431-436—DOI 10.1007/s12600-009-0056-1.
Kittemann et al.—GRAS (Generally Recognized as Save) Methods as a Possible Control of Postharvest Fungal Diseases in Sweet Cherry—Acta Horticulturae Mar. 2010—DOI: 10.17660/ActaHortic.2010.858.55.
Gabler, F. Mlikota et al.—Postharvest Control of Table Grape Gray Mold on Detached Berries with Carbonate and Bicarbonate Salts and Disinfectants—Am J Enol Vitic. 2001 52:12-20; DOI: 10.5344/ajev.2001.52.1.12.

(Continued)

*Primary Examiner* — Zohreh A Fay
(74) *Attorney, Agent, or Firm* — Sierra IP Law, PC; William K. Nelson

(57) ABSTRACT

A moisture-activated carbon dioxide ($CO_2$) release system is disclosed for postharvest preservation of fruits, vegetables, and other fresh plant products. The system comprises a composition including sodium bicarbonate (SBC) and citric acid that, upon exposure to humidity, rapidly generates $CO_2$ gas to suppress fungal growth. Various deployment systems enable immediate or sustained release based on packaging conditions and crop type. The system provides a safer alternative to traditional fumigation, and provides improved decay control and extended shelf life.

20 Claims, 4 Drawing Sheets

(56) References Cited

OTHER PUBLICATIONS

Allagui, Mohamed et al.—Effectiveness of Several GRAS Salts against Fungal Rot of Fruit after Harvest and Assessment of the Phytotoxicity of Sodium Metabisufite in Treated Fruit—J. Fungi 2024, 10, 359; https://doi.org/10.3390/jof10050359.
Ahmed, Saeed et al.—Effects of Different Sulfur Dioxide Pads on Botrytis—Mold in 'Italia' Table Grapes under Cold Storage—Horticulturae 2018, 4, 29; doi:10.3390/horticulturae4040029.
Kim, Minkyeong et al.—Comparative Diminution of Patulin Content in Apple Juice With Food-Grade Additives Sodium Bicarbonate, Vinegar, Mixture of Sodium Bicarbonate and Vinegar, Citric Acid, Baking Powder, and Ultraviolet Irradiation—Front. Pharmacol. 9:822; doi: 10.3389/fphar.2018.00822.
Chalker-Scott, Linda—miracle, myth . . . or marketing Baking soda will fungi fail and roses rejoice?—retrieved Jan. 6, 2025; https://wpcdn.web.wsu.edu/wp-puyallup/uploads/sites/403/2015/03/baking-soda.pdf.
Lyousfi, Nadia et al.—Combination of Sodium Bicarbonate (SBC) with Bacterial Antagonists for the Control of Brown Rot Disease of Fruit—J. Fungi 2022, 8, 636. https://doi.org/10.3390/jof8060636.
Helalia, A.R. et al.—Efficacy of Fungicides—Sodium Bicarbonate Combinations on Citrus Postharvest Green Mould Disease—Middle East Journal of Agriculture Research, 3(2): 194-200, 2014; https://www.curresweb.com/mejar/mejar/2014/194-200.pdf.
Smilanick, Joseph et al.—Control of Citrus Green Mold by Carbonate and Bicarbonate Salts and the Influence of Commercial Postharvest Practices on Their Efficacy—retrieved Jan. 6, 2025—https://apsjournals.apsnet.org/doi/10.1094/PDIS.1999.83.2.139.
Sunset 2017 Review, Meeting 2—Review, Handling Substances §205.605(b), Oct. 2015—retrieved Jan. 6, 2025—https://www.ams.usda.gov/sites/default/files/media/HS2017SnstSummaries205.605%28b%29Oct2015.pdf.
Youssef, Khamis et al.—Electrolysed water and salt solutions can reduce green and blue molds while maintain the quality properties of 'Valencia' late oranges—Postharvest Biology and Technology vol. 159, Jan. 2020, 111025; https://doi.org/10.1016/j.postharvbio.2019.111025.
Antunes, M.D.C. et al.—The Effect of Postharvest Treatments with Sodium Bicarbonate or Acetic Acid on Storage Ability and Quality of Fig Fruit—Acta Horticulturae, (798), 279-284; doi:10.17660/actahortic.2008.798.40.
Ansar et al.—Optimasi Formula Dan Gaya Tekan Terhadap Sifat Tablet Effervescent Buah Markisa [Formula and Compression Forces Optimization on the Characteristic of Effervescent Tablet of Passion Fruits]—Jurnal Teknologi dan Industri Pangan (Edisi), Apr. 2006, vol. 17 (1), p. 23-27; https://journal.ipb.ac.id/index.php/jtip/article/view/407.
Ruiz, Raquel G. et al.—Effect of Soaking and Cooking on the Saponin Content and Composition of Chickpeas (*Cicer arietinum*) and Lentils (*Lens culinaris*)—J. Agric. Food Chem. 1996, 44, 1526-1530; DOI: 10.1021/jf950721v.
Lang, Clara V. et al.—Investigation of eco-friendly chemical treatments of apple pomace for producing high quality molded pulp biocomposite—Journal of applied polymer science, Dec. 2021, vol. 138 (46), p.n/a; DOI:10.1002/app.51363.
Ehteshami, Sakineh et al.—Maintenance of quality and bioactive compounds of cold stored pomegranate (*Punica granatum* L.) fruit by organic acids treatment—Food science and technology international, Mar. 2021, vol. 27 (2), p. 151-163; DOI: 10.1177/1082013220940466.
Zhu, Ruiyu et al.—Postharvest Control of Green Mold Decay of Citrus Fruit Using Combined Treatment with Sodium Bicarbonate and Rhodosporidium paludigenum—Food Bioprocess Technol (2013) 6:2925-2930; DOI 10.1007/s11947-012-0863-0.
Dorostkar, M. et al.—Postharvest quality responses of pomegranate fruit (cv. Shishe-kab) to ethanol, sodium bicarbonate dips and modified atmosphere packaging—Advances in horticultural science, Jun. 2022, vol. 36 (2), p. 107-117; DOI: 10.36253/ahsc-12041.
Ippolito, Antonio et al.—Control of postharvest rots of sweet cherries by pre- and postharvest applications of Aureobasidium pullulans in combination with calcium chloride or sodium bicarbonate—Postharvest biology and technology, Jun. 2005, vol. 36 (3), p. 245-252; DOI: 10.1016/j.postharvbio.2005.02.007.
Palou, Lluis et al.—Hot water, sodium carbonate, and sodium bicarbonate for the control of postharvest green and blue molds of clementine mandarins—Postharvest biology and technology, 2002, vol. 24 (1), p. 93-96; DOI: 10.1016/S0925-5214(01)00178-8.
Casals, Carla et al.—Combination of hot water, Bacillus subtilis CPA-8 and sodium bicarbonate treatments to control postharvest brown rot on peaches and nectarines—European journal of plant pathology, Sep. 2010, vol. 128 (1), p. 51-63; https://link.springer.com/article/10.1007/s10658-010-9628-7.
Romanazzi, Gianfranco et al.—Recent advances on the use of natural and safe alternatives to conventional methods to control postharvest gray mold of table grapes—Postharvest biology and technology, 2012, vol. 63 (1), p. 141-147; DOI: 10.1016/j.postharvbio.2011.06.013.
Youssef, Khamis et al.—Applications of salt solutions before and after harvest affect the quality and incidence of postharvest gray mold of 'Italia' table grapes—Postharvest biology and technology, Jan. 2014, vol. 87, p. 95-102; DOI: 10.1016/j.postharvbio.2013.08.011.
Dantas, Beatriz Costa et al.—Postharvest Conservation of 'BRS Nubia' Hybrid Table Grape Subjected to Field Ultra-Fast SO2-Generating Pads before Packaging—Horticulturae, Mar. 2022, vol. 8 (4), p. 285; DOI: 10.3390/horticulturae8040285.
Youssef, Khamis et al.—Sodium carbonate and bicarbonate treatments induce resistance to postharvest green mould on citrus fruit—Postharvest Biology and Technology vol. 87, Jan. 2014, pp. 61-69; https://doi.org/10.1016/j.postharvbio.2013.08.006.
Gosavi, Seema et al.—An Updated Review on Analytical Method Validation of Tartaric Acid from Sodium Bicarbonate, Sodium Citrate, Citric Acid and Tartaric Acid Granules by RP-HPLC—Asian Journal of Pharmaceutical Analysis, 2024; 14(2):81-5; doi: 10.52711/2231-5675.2024.00015.
English language abstract of foreign patent document CN103976017A, downloaded Jan. 6, 2025, https://patents.google.com/patent/CN103976017A/en?oq=CN103976017A.
English language abstract of foreign patent document CN104450307A, downloaded Jan. 25, 2025, https://patents.google.com/patent/CN104450307A/en?oq=CN104450307A.
English language abstract of foreign patent document CN105062702A, downloaded May 20, 2025, https://patents.google.com/patent/CN105062702A/en?oq=CN105062702A.
English language abstract of foreign patent document CN105454411A, downloaded May 22, 2025, https://patents.google.com/patent/CN105454411A/en?oq=CN105454411A.
English language abstract of foreign patent document CN106190653A, downloaded May 20, 2025, https://patents.google.com/patent/CN106190653A/en?oq=CN106190653A.
English language abstract of foreign patent document CN108850141A, downloaded May 20, 2025, https://patents.google.com/patent/CN108850141A/en?oq=CN108850141A.
English language abstract of foreign patent document CN110916043A, downloaded May 20, 2025, https://patents.google.com/patent/CN110916043A/en?oq=CN110916043A.
English language abstract of foreign patent document CN113563984A, downloaded May 22, 2025, https://patents.google.com/patent/CN113563984A/en?oq=CN113563984A.
English language abstract of foreign patent document CN113678884A, downloaded Jan. 25, 2025, https://patents.google.com/patent/CN113678884A/en?oq=CN113678884A.
English language abstract of foreign patent document CN113678886A, downloaded Jan. 25, 2025, https://patents.google.com/patent/CN113678886A/en?oq=CN113678886A.
English language abstract of foreign patent document ES2719235T3, downloaded May 22, 2025, https://patents.google.com/patent/ES2719235T3/en?oq=ES2719235T3.

* cited by examiner

Accumulated carbon dioxide emission (%) measured during the treatment after applying 7.0 grams of sodium bicarbonate (SBC) combined with 5.0 grams of citric acid sachet in a 20 liters table grape plastic box. Each point represents the average of three replications.

FIG. 5

| Treatment | Rachis Condition (1-4) | Gray Mold (%) | Incidence of Gray Mold relative to Untreated (%) |
|---|---|---|---|
| 7g SBC | 3-4 | 0.8a | 32.0 |
| 7g SBC+5g CA | 2-3 | 0.3b | 12.0 |
| Untreated | 3-4 | 2.5c | 100.0 |

Natural decay incidence in organic ‘Stella Bella’ table grapes affected by Sodium Bicarbonate (SBC) with and without catalyzer (citric acid, CA) treatments applied at harvest and measured after 4 weeks of cold storage (2022 season). Rachis conditions: 1=Green-healthy; 2=Slight only cap stems showing browning, 3=moderate = cap stems and secondary stems showing browning, and 4= severe = cap stems, secondary and primary stems fully brown.

FIG. 6

| Cultivars | Gray Mold (%) | | |
|---|---|---|---|
| | Untreated | 7g SBC+5g CA | Incidence of Gray Mold relative to Untreated (%) |
| ‘Stella Bella’ | 11.0a | 0.7b | 6.4 |
| ‘Scarlet Royal’ | 25.0a | 0.4b | 1.6 |
| ‘Flame Seedless’ | 35.0a | 2.0b | 5.7 |
| ‘Thompson Seedless’ | 48.0a | 1.7b | 3.5 |
| ‘Sugranineteen’ | 21.8a | 1.3b | 6.0 |
| ‘Alisson’ | 62.0a | 8.0b | 12.9 |
| ‘Redglobe’ | 11.1a | 2.7b | 24.3 |

Natural decay incidence in seven organic table grape cultivars by Sodium Bicarbonate (SBC) with and without catalyzer (citric acid, CA) treatments applied at harvest and measured after 4 weeks of cold storage (2023 season). Rachis conditions: 1=Green-healthy; 2=Slight only cap stems showing browning, 3=moderate = cap stems and secondary stems showing browning, and 4= severe = cap stems, secondary and primary stems fully brown.

FIG. 7

| Treatment | Rachis Condition (1-4) | Gray Mold (%) | Incidence of Gray Mold relative to Untreated ( %) |
|---|---|---|---|
| Untreated | 2-3 | 4.1a | 100.0 |
| 7g SBC+5g CA | 3-4 | 0.4b | 9.8 |

Natural decay incidence in 'Crimson Seedless' table grape affected by Sodium Bicarbonate (SBC) with and without catalyzer (citric acid, CA) treatments applied at harvest and measured after 4 weeks of cold storage (2024 season). Rachis conditions: 1=Green-healthy; 2=Slight only cap stems showing browning, 3=moderate = cap stems and secondary stems showing browning, and 4= severe = cap stems, secondary and primary stems fully brown.

FIG. 8

| Treatment | Rachis Condition (1-4) | Gray Mold (%) | Gray Mold relative to untreated (%) |
|---|---|---|---|
| Untreated | 2-3 | 22.0a | 100.0 |
| 7g SBC+5g CA | 3-4 | 9.0b | 41.0 |

Natural decay incidence in 'Flame Seedless' table grape affected by Sodium Bicarbonate (SBC) with and without catalyzer (citric acid, CA) treatments applied at harvest and measured after 4 weeks of cold storage (2024 season). Rachis conditions: 1=Green-healthy; 2=Slight only cap stems showing browning, 3=moderate = cap stems and secondary stems showing browning, and 4= severe = cap stems, secondary and primary stems fully brown.

CATALYZED CARBON DIOXIDE ORGANIC RELEASE SYSTEM FOR PREVENTING SPOILAGE IN POSTHARVEST CROPS AND RELATED METHODS

FIELD OF THE INVENTION

The present invention relates to a controlled-release fumigation system specifically designed for postharvest preservation of perishable produce through carbon dioxide ($CO_2$) emission. More particularly, the present invention provides a sodium bicarbonate (SBC) and citric acid-based dry mixture composition that enables efficient and accelerated $CO_2$ release in the field, immediately post harvest, in harvest storage boxes, shipping boxes, marine shipping container, and other storage and shipping containers to suppress fungal growth in harvested fruits and vegetables other susceptible commodities, delivery mechanisms for the composition, and related methods.

BACKGROUND OF THE INVENTION

Gray mold (*Botrytis cinerea*) is the most destructive postharvest disease of table grapes, blueberries, and figs, and other fresh fruit and vegetable primarily because it develops at temperatures as low as −0.5° C. and can spread from berry to berry or fruit to fruit. *Botrytis* rot on grapes can be diagnosed by its characteristic “slip skin” that develops on the surface of infected berries. Areas infected with gray mold on the berry skin turn brown and slip freely when rubbed, leaving the firm, underlying flesh exposed. Later, white, thread-like hyphal filaments erupt through the berry surface and finally, masses of gray-colored conidia develop. Uncontrolled infections spawn aerial mycelium that spreads adjacently in berries (“nests”). Prompt cooling and pre-storage fumigation with sulfur dioxide ($SO_2$) must be used to control gray mold.

However, treatments with excessive levels of $SO_2$ can damage table grapes by bleaching, causing sunken areas or hairline cracks on the berry surface, and/or contributing to premature browning of the stems.

Also, the use of sulfur dioxide gas is not permitted on certified organic grapes and there are no effective postharvest disease control treatment options for the organic grapes. Depending on the season, cultivar, and/or storage conditions, losses due to gray mold disease (*Botrytis cinerea*) can reach high percentages (0-50%) of natural *botrytis* infection. Because of consumers’ demand for organic grapes, several alternatives to $SO_2$ have been investigated without success.

$SO_2$ fumigation causes a number of problems: some people are highly allergic to sulfite residues that form after fumigation, $SO_2$ can cause worker respiratory issues, $SO_2$ can damage equipment, and $SO_2$ is an air pollutant. Environmental regulations on $SO_2$ have become stricter to address these issues. Some regulatory agencies restrict discharge of $SO_2$ into the air near urban areas. At the same time, workers must not be exposed to gas concentrations above 2 ppm during sulfur dioxide application. Thus, careful attention to $SO_2$ treatment procedures is necessary to minimize exposure of workers and damage to fruit. Sulfite residue on fruit at the point of consumption is also a concern. Current $SO_2$ application techniques can cause excessive sulfite residue on the treated fruit. Sulfite residues in, e.g., grapes are currently limited to <10 ppm by the United States Environmental Protection Agency.

Therefore, there exists a need for improved methods of preventing fungal damage to table grapes, other fruit, and other crops.

SUMMARY OF THE INVENTION

The present invention relates to a method and composition for enhancing the controlled release of carbon dioxide ($CO_2$) gas in postharvest fresh fruit packaging to improve decay control, protect fruit quality, and extend shelf life. Specifically, the invention involves the use of a dry mixture containing sodium bicarbonate ($NaHCO_3$, “SBC”) and citric acid ($C_6H_8O_7$) as a catalyzer to accelerate and increase the total yield of $CO_2$ gas in the presence of moisture. The timing may be immediately post picking, when fruit clusters has been trimmed and individually field packed in the shipping box and then sealed-in by external plastic liner, in the case of table grape production as an example, but can be adapted to other fruit and vegetable individual and specific postharvest processes.

Carbon dioxide ($CO_2$) gas is an effective postharvest treatment for inhibiting fungal growth and decay in fresh fruit during storage and shipping. Unlike traditional sulfur dioxide ($SO_2$) fumigation, which can cause fruit bleaching and sulfite residue accumulation, $CO_2$ offers a non-toxic, organic-compatible alternative for preserving fruit quality while minimizing environmental and health risks. The ability of $CO_2$ to suppress fungal proliferation, particularly *Botrytis cinerea* (gray mold), without harming the fruit itself makes it a valuable tool in postharvest management.

$CO_2$ inhibits fungal growth through multiple biochemical and physiological mechanisms, making it an effective method for preserving fruit during storage and transport. One of the primary ways $CO_2$ suppresses fungal development is by reducing fungal sporulation and growth rates. Many common postharvest pathogens, such as *Botrytis cinerea*, rely on oxygen for spore germination and proliferation. When $CO_2$ concentrations increase, oxygen levels decrease, disrupting fungal metabolism and significantly slowing or even halting the germination process. Additionally, $CO_2$ interferes with enzyme expression, membrane function and metabolic pathways in fungal species. It affects cellular pH regulation and ion transport across membranes, ultimately reducing fungal viability. These physiological disruptions impair the ability of fungi to colonize fruit surfaces and establish infections, further limiting their ability to spread.

Beyond these direct effects on fungal physiology, $CO_2$ also inhibits enzymatic activity critical for fungal invasion. Many fungi produce hydrolytic enzymes such as polygalacturonases, which break down the pectin in fruit cell walls, leading to softening and decay. Elevated $CO_2$ concentrations may suppress these enzymatic reactions, preventing fungal penetration into fruit tissues and maintaining fruit integrity. Additionally, $CO_2$ exposure induces osmotic stress on fungal spores. The high $CO_2$ environment creates imbalances in water movement across fungal cell membranes, leading to dehydration and reduced germination rates. This effect is compounded by the low oxygen conditions in $CO_2$-enriched environments, placing additional stress on fungal cells and making it difficult for infections to spread. Together, these mechanisms make $CO_2$ an effective, non-toxic method for fungal suppression in postharvest fruit storage, helping to extend shelf life while maintaining fruit quality.

In addition to its antifungal properties, $CO_2$ does not damage fruit when used at controlled concentrations, making it an effective and safe method for postharvest preservation. Several factors contribute to its safety for fresh produce. One key factor is its ability to maintain cellular respiration in harvested fruit. Fruits continue to respire after harvest, requiring oxygen while naturally producing $CO_2$ as a byproduct. When applied in moderate concentrations, e.g., between about 5% to 40% carbon dioxide by volume (50,000 to 400,000 ppm $CO_2$) in modified atmosphere packaging, $CO_2$ slows down respiration without inducing anaerobic conditions that could lead to off-flavors or tissue damage. This controlled regulation of respiration helps preserve fruit freshness without negatively affecting quality.

Additionally, $CO_2$ prevents water loss, browning and desiccation, a common issue with traditional $SO_2$ fumigation, which can dehydrate fruit tissues. Unlike $SO_2$, which extracts moisture and can cause shriveling, $CO_2$ helps maintain turgor pressure in fruit cells, keeping the fruit firm and visually appealing throughout storage and transportation. Another advantage of $CO_2$ treatment is its role in preserving color and texture. High $CO_2$ levels inhibit enzymatic browning reactions that can degrade the visual quality of fruit. Anthocyanins and chlorophyll, which contribute to the rich color in fruit, e.g., the reds, purples, and greens of grape cultivars, remain stable under $CO_2$-enriched conditions, preventing discoloration and ensuring a fresh appearance.

$CO_2$ also extends shelf life without leaving chemical residues. Unlike chemical fungicides or $SO_2$ fumigation, which can raise regulatory concerns due to residual sulfites, $CO_2$ dissipates naturally upon exposure to ambient air, leaving no harmful substances on the fruit. This makes $CO_2$ treatment particularly appealing for organic fruit storage and shipping, as it complies with organic handling standards and meets consumer demand for chemical-free produce. By using $CO_2$ as a natural antifungal agent, fresh fruit shipments can be effectively protected from decay while maintaining their quality, prolonging storage life, and ensuring safe transport across global markets.

The use of sodium bicarbonate and citric acid to generate $CO_2$ in postharvest fruit storage presents a particularly low-risk approach to fungal suppression and decay prevention. Both sodium bicarbonate and citric acid are widely recognized as safe (GRAS) by regulatory agencies such as the FDA and are commonly used as food additives, making them an ideal choice for direct application in fruit packaging. When these two compounds react within a sealed plastic liner containing fruit or vegetable, picked and pack in the field, in the presence of moisture, they produce $CO_2$ gas in a controlled manner, creating an environment that inhibits fungal growth without introducing harmful chemicals or residues.

Unlike chemical fumigants or preservatives, sodium bicarbonate and citric acid do not leave behind toxic byproducts that could compromise fruit safety or consumer health. Their reaction is entirely natural and mimics biological processes already occurring within the fruit, ensuring that postharvest treatment remains non-invasive and non-toxic.

The controlled reaction between sodium bicarbonate and citric acid in the presence of moisture generates carbon dioxide gas through the following reaction in an aqueous environment:

$$NaHCO_3 + H_3C_6H_5O_7 \longrightarrow Na_3C_6H_5O_7 + H_2O + CO_2$$

The dry mixture can be delivered using different application platforms, such as sachets (tea bags), small canister dispensers, box liner labels, cluster bags, and laminated paper or plastic sheets. These delivery systems optimize $CO_2$ release based on specific packing operations and environmental conditions. Typically, the delivery system will be deployed in a sealed plastic liner containing fruit or vegetable, immediately after picking and packing in the field.

The combination of SBC and citric acid may be made through a mixture of SBC and citric acid powders or granules. In order to promote the chemical reaction between SBC and citric acid in the presence of moisture and to optimize their combination for efficient and accelerated $CO_2$ release, different delivery systems may be utilized depending on specific individual postharvest picking, packing, cold storage, freight or marine container transient used.

Microencapsulation may be used as a method for controlled $CO_2$ release. In this process, SBC and citric acid are encapsulated together within food-grade polymer coatings, such as hydroxypropyl methylcellulose, alginate, or starch-based materials. These microcapsules regulate moisture exposure, ensuring that the reaction between SBC and citric acid does not occur prematurely. Once the humidity inside a fruit container increases, the polymer coating begins to dissolve, gradually releasing $CO_2$ gas through the controlled breakdown of SBC catalyzed by citric acid. This method offers several advantages, including gradual and sustained $CO_2$ emission, which helps maintain consistent fungal protection over an extended period. Additionally, microencapsulation prevents premature activation due to ambient moisture fluctuations, reducing the likelihood of excessive $CO_2$ bursts to maintain a preferred concentration of $CO_2$ in a harvest storage boxes, shipping boxes, marine shipping container, and other storage and shipping containers.

In other implementations, tablets or pellets may be used in particular delivery systems, e.g., canister dispensers, fruit coatings, sachet, tea bags and others. SBC and citric acid may be compressed a tablet press or other device into a tablet comprising the combination of SBC and citric acid. A hydrophilic polymer coating, such as carboxymethyl cellulose, may be applied to regulate moisture penetration, preventing premature activation. When the tablet comes into contact with moisture, the outer coating may dissolve, and the moisture then penetrates the combination of SBC and citric acid resulting in the efficient production of $CO_2$ gas. Additionally, these tablets have enhanced shelf stability, remaining inactive until exposed to moisture, which extends their usability in pre-packaged dispensers or liners. Their compact and structured form also makes them easy to handle, transport, and integrate into $CO_2$-emitting canisters or packaging systems, providing a reliable and efficient approach for fruit preservation during long-distance shipping.

In other embodiments, the SBC-citric acid composition may be incorporated into a gel-based or coated film technology that can be used in box liner labels and moisture-regulated dual-layer systems. In this process, SBC and citric acid are embedded within a gel matrix composed of hydrogel or alginate-based films. These films are then laminated onto liners or pads, ensuring a gradual and controlled $CO_2$ diffusion over time. The gel matrix is designed to absorb moisture progressively, preventing sudden activation and avoiding rapid $CO_2$ bursts that could lead to excessive exposure. Gel-based films can be seamlessly integrated into thin liner materials without adding significant bulk, making them an efficient and space-saving solution. Moreover, this controlled-release system prevents excessive $CO_2$ exposure, maintaining their quality and market appeal during shipping.

In further embodiments, buffered granules provide a further solution for $CO_2$ release in harvest storage boxes, shipping boxes, marine shipping container, and other storage and shipping containers. In this delivery form, SBC and citric acid are granulated either separately or in combination and may be coated with silica or calcium carbonate to prevent premature activation due to ambient moisture. The granules may be stored inside a dispenser canister. Buffered granules may provide a steady diffusion that maintains a controlled gas concentration within a shipping container in two phases or in industry nomenclature called single or dual activation release. The delayed activation phase and extends the protection period provided by the buffered granules are beneficial for long-term $CO_2$ regulation in controlled storage environments, reducing the need for frequent replacements.

In further embodiments, the mixture of SBC and citric acid may be integrated into a spray form with a carrier (e.g., paraffin wax, carnauba wax, lecithin, hydroxypropyl methylcellulose [HP MC], chitosan-based coatings, alginate hydrogels, and other appropriate carriers). In some implementations, paraffin wax serves as a protective carrier, encapsulating the reactive components and regulating their exposure to moisture, which prevents premature $CO_2$ release and enhances long-term preservation. The SBC and citric acid ingredients may be milled into micro-sized particles to improve dispersion within the paraffin matrix. SBC and citric acid are then kept in separate oil-based suspensions to prevent an early reaction. A small amount of emulsifier or dispersing agent, such as lecithin or a non-ionic surfactant, may be added to stabilize the suspension and ensure uniform distribution. The paraffin wax is then melted at a controlled temperature (typically 50-70° C., depending on the wax grade), creating a uniform liquid phase. Once the wax reaches the optimal temperature, the SBC and citric acid dispersions are introduced slowly, ensuring even incorporation. In some examples, the ratio of SBC to citric acid may be in a range of about 2:1 to 1:2. In some implementations, a microencapsulation or phase-separation technique may be applied, forming tiny dispersed droplets of the reactive compounds within the paraffin matrix. After the active ingredients are fully integrated, the paraffin-SBC-citric acid mixture may be emulsified in a non-aqueous carrier solution, such as mineral oil or ethanol, to adjust viscosity for spraying. The final formulation may then be cooled and homogenized to maintain a stable dispersion suitable for aerosol or fine mist applications.

Once prepared, the SBC-citric acid paraffin spray can be deployed in shipping environments using various methods. One approach is direct spraying onto box liners or $CO_2$-emitting pads, where the coating provides a thin, controlled-release layer that gradually degrades upon exposure to humidity, releasing $CO_2$ gas over time. Alternatively, the spray can be applied to the interior surfaces of shipping containers.

Another option is encapsulate into microbeads, where the formulation is sprayed as microdroplets, solidifying into small beads inside the container or on another surface such as a sticker or label surface. The beads may gradually degrade in response to humidity, ensuring sustained $CO_2$ release over an extended period.

The wax-based formulation provides strong surface adhesion, allowing it to coat liners, walls, pads, stickers, labels, and other surfaces evenly without leaving excessive residue. The paraffin carrier may further enhance shelf stability, shielding the active ingredients and preventing degradation before activation.

Delivery Mechanisms

Sheets or Pads

In some embodiments, the combination of the citric acid and SBC may be deployed in a sheet or pad infused with the combination. The sheets or pads may include a chemically active layer that includes the combination of SBC and citric acid, which may be encapsulated in a composite material consisting of plastic and paper. A plastic layer helps contain the SBC and citric acid, while the paper layer allows moisture absorption triggering the chemical reaction between SBC and citric acid to release $CO_2$. The chemically active layer may include, e.g., about 10% to about 30% sodium bicarbonate by weight and about 5% to about 25% citric acid by weight. The sheets or pads may be designed to release a controlled amount of $CO_2$ to match the requirements of fruit storage, with the specific formulation of the pad determining how quickly and for how long the $CO_2$ would be released.

In use, a sheet or pad may be placed in a fruit shipping containers, such as a shipping box with micro-perforated liners inside to ensure a small percentage of the ventilation. Fruit containers, such as clamshells, cartons, mesh bags, or other packaging, containing harvested fruit, such as grapes, blueberries, strawberries, cherries, kiwifruit, figs etc. The sheets or pads may be placed in the shipping containers in proximity to the fruit, but not in direct contact with the fruit. In some examples, the sheets or pads may be positioned in the perimeter of the shipping container. In other examples, the sheets or pads may be individually placed in the fruit containers, e.g., clam shells. The sheets or pads are preferably positioned in upper portion (at or near the upper wall of the shipping container and/or the fruit containers. This positioning may result in the fruit being more thoroughly exposed to the $CO_2$ gas, as $CO_2$ is denser than air and will flow downward in the shipping container.

In one embodiment, a multilayer laminated sheet may be used to deliver SBC and citric acid composition. The sheet may include a first and a second sheet composed of gas-permeable, moisture-transmissible material such as polyester, polypropylene, or polyethylene. Laminated between these two sheets may be a layer of wax-based or adhesive laminating substance in which a dry mixture of sodium bicarbonate (SBC) and citric acid is dispersed.

The SBC and citric acid are present in a predetermined weight ratio, such as approximately 1:1 to about 7:5. For example, the composition may include about 7 wt % to about 35 wt % SBC and about 5 wt % to about 25 wt % citric acid, embedded uniformly within a paraffin or microcrystalline wax matrix that serves as the laminating substance. This laminated structure facilitates controlled release of $CO_2$ gas upon absorption of ambient moisture, as encountered in high-humidity storage or shipping containers for fresh fruit.

The laminated sheet may be cut into rectangular sheets and inserted in fruit shipping cartons such that the moisture emitted by the fruit permeates the synthetic sheet material and initiates the $CO_2$-generating reaction. The rate of gas emission may be modulated by adjusting sheet thickness and the SBC/citric acid ratio.

To facilitate a higher initial release rate, one of the laminate sheets may be patterned with apertures or sized smaller than the other to expose a portion of the active laminating layer directly to the internal carton atmosphere. In some embodiments, the laminating substance may contain microencapsulated SBC and citric acid particles to provide a sustained release profile and prevent premature activation during handling or storage in ambient conditions.

Optionally, a humectant such as glycerol or a hygroscopic salt such as calcium chloride may be incorporated into the laminating matrix to enhance moisture uptake, thereby improving activation efficiency in relatively low-humidity environments.

The $CO_2$ release in the harvest storage boxes, shipping boxes, marine shipping container, freight container, and other storage and shipping containers is moisture-dependent. Most fresh produce is held at above 90% humidity, which insure catalyzation of compounds under nearly all conditions. When the fruit is packaged and stored, the moisture inside the shipping box (from the fruit and the environment) is absorbed by the sheets or pads. As the moisture reacted with the SBC and citric acid in the sheets or pads, carbon dioxide gas is emitted according to the chemical formula provided above.

Box Liner Labels

In some embodiments, the SBC and citric acid may be deployed through box liner labels impregnated with the mixture to control fungal growth with controlled $CO_2$ release. Box liner labels can take the form of either adhesive-backed sheets or non-adhesive liners placed inside shipping boxes. These labels can be impregnated with a mixture of SBC and citric acid through coated films (e.g. paraffin, plant-based proteins and others) where the liner label is made from plastic or paper-based material coated with a thin layer of SBC and citric acid. The coating gradually emits $CO_2$ over time as it interacts with ambient moisture inside the carton.

In other implementations, the SBC and citric acid mixture may be applied to the box liner label by microencapsulation, in which microscopic polymer shells embedded in the label material contain SBC and citric acid. These capsules slowly break down when exposed to humidity, ensuring a controlled and sustained $CO_2$ release.

In further implementations, the SBC and citric acid mixture may be applied to the box liner label through absorbent fiber integration or fruit bag impregnation, where the liner is made from cellulose or non-woven fibers infused with SBC and citric acid powder. As moisture levels rise inside the carton, the fibers activate the chemical reaction between SBC and citric acid, leading to a gradual and steady emission of $CO_2$ gas.

In still further implementations, the SBC and citric acid mixture may be applied in dual-layer strips to the labels, which include two layers—one containing the SBC and citric acid mixture (active layer) and another acting as a moisture regulator to control gas diffusion (moisture regulating layer). This design may provide consistent and prolonged $CO_2$ gas release, offering extended protection for the fruit. The active layer including the SBC and citric acid mixture may be made from cellulose-based fibers or plastic laminates infused with pre-determined amounts of SBC and citric acid. For example, the active layer may include SBC in a range of about 1.5 $mg/cm^2$ to about 15 $mg/cm^2$ and citric acid in a range of about 1.0 $mg/cm^2$ to about 12 $mg/cm^2$. The controlled structure of this layer provides a steady emission of $CO_2$ to prevent fungal growth without exceeding safe exposure limits for the fruit.

The outer layer of the dual-layer $CO_2$-releasing strip, the moisture regulating layer, acts as a barrier and buffer between the external environment and the inner SBC/citric acid-layer. The moisture regulating layer may be composed of hydrophilic and semi-permeable materials, which allow for controlled moisture diffusion while preventing direct exposure to excessive humidity, providing a gradual and steady release of $CO_2$ gas. The moisture regulating barrier may be made from microporous polymer films, coated paper, or non-woven fabric. The moisture regulating layer may moderate the amount of water vapor that reaches the SBC/citric acid layer in part by the inclusion of specific pore sizes in the layer, allowing for slow and consistent diffusion of moisture rather than rapid absorption, which could lead to an uncontrolled release of $CO_2$. In some examples, the pore size in the moisture regulating layer may be in a range of about 1 μm to about 5 μm.

Sachets or Tea Bags

SBC and citric acid may be incorporated into a sachet as a delivery mechanism in a postharvest storage or container system. Sachets are typically made from semi-permeable, moisture-absorbing materials such as non-woven fabric, cellulose-based paper, or perforated plastic. The material must be organic, preferably recyclable and breathable enough to allow controlled diffusion but sturdy enough to prevent SBC and citric acid powders from leaking therefrom. Each sachet contains a measured amount of SBC and citric acid, e.g., between about 1 g to about 14 g of SBC and about 0.5 g to about 10 g citric acid. A single sachet may be used per kilogram of fruit. The sachet may include other optional additives such as silica gel to regulate humidity and prevent excessive $CO_2$ bursts.

The sachets are designed in various sizes, with small sachets placed in individual fruit containers, medium-sized ones used in shipping pallets, and larger sachets deployed in a shipping container, but outside of the fruit containers. In some examples, a small sachet, which may be used for individual fruit containers, may contain 1 g to 10 g of SBC and about 0.5 to about 8 g citric acid. The volume of a small sachet may be in a range from about 1 $cm^2$ to about 4 $cm^2$. The sachet is generally compact, measuring approximately 3 cm by 3 cm, with a thickness varying between about 0.5 cm and 1 cm to allow for efficient placement within the packaging while ensuring controlled carbon dioxide release. In individual fruit containers, small sachets may be placed above the fruit, e.g., under perforated liners, allowing a gradual release of $CO_2$.

A medium-sized sachet may be used in field harvest boxes at picking, product boxes packed at packing sheds and then moved to cold storage, and repacked produce that is repalletized for shipments domestically or for export markets. In some examples, the sachets may contain 5 g to 15 g of SBC and about 3.5 g to about 13 g citric acid. The volume of the medium sachet may be in a range of about 4 $cm^2$ to 8 $cm^2$. In some examples, the sachet dimensions may be approximately 5 cm by 5 cm, with a thickness of about 1 cm. Medium-sized sachets (5-10 grams) may be inserted between layers of fruit containers in a shipping box to create even gas distribution while keeping $CO_2$ concentrations within preferred limits.

A large sachet may be used in marine shipping containers (20 ft, 40 ft, and 53 ft) that may require higher concentrations and amounts of SBC and citric acid. For example, a large sachet may include about 40 g to about 100 g of SBC and about 25 g to about 80 g citric acid dual composition blend. The large sachet volume may range between about 15 $cm^2$ and about 40 $cm^2$. A large sachet measures approximately 8 cm by 8 cm, with a thickness in a range of from about 1.5 cm to about 2 cm to ensure an adequate surface area for controlled Carbon dioxide release. In the shipping container itself, larger sachets may be positioned to release $CO_2$ gas throughout the storage environment. These sachets can be hung from the upper surface of the container, placed in air circulation ducts to ensure even gas distribution, or attached to the inner walls to keep them away from direct contact with the fruit containers.

Since $CO_2$ release is moisture-dependent, sachets absorb ambient moisture inside the carton, triggering the release of $CO_2$ gas. In a well-regulated shipping container, the $CO_2$ gas concentration may be in a range of between 5% to 40% carbon dioxide (50,000 to 400,000 ppm $CO_2$). Maintaining lower temperatures in shipping containers slows down $CO_2$ release, providing extended protection throughout the journey.

Canister Dispensers

SBC and citric acid may be incorporated into a cannister dispenser as a delivery mechanism in a postharvest storage or marine shipping container system. A small canister dispenser is a rigid, vented container designed to house granulated or powdered sodium bicarbonate and citric acid while allowing for controlled moisture absorption and gas release. These canisters may be made from plastic, aluminum, or stainless steel and feature a semi-permeable membrane or adjustable vents to regulate the amount of $CO_2$ emitted therefrom.

In some examples, the canisters may include about 10 g to about 100 g of SBC and about 7 g to about 70 g citric acid. The canister dispensers may be positioned within the storage boxes, shipping boxes, and/or shipping containers to create an even dispersion of $CO_2$ while preventing overexposure. The canisters can be attached to the inner walls or lids of the shipping containers, ensuring localized $CO_2$ diffusion without direct contact with the fruit. This is especially useful for fruit stored in clamshells, where ventilation may be limited.

Internally, the canister may contain a moisture-wicking layer to draw in moisture from the surrounding air, triggering a gradual release of $CO_2$ from the SBC and citric acid mixture. In some embodiments, a dual-compartment system may be used in the dispenser canisters, where one chamber holds the SBC and citric acid mixture, and the other absorbs excess moisture, preventing sudden bursts of $CO_2$. In some embodiments, the canister may include a hygroscopic membrane that carefully regulates humidity absorption, providing long-lasting and even distribution of $CO_2$ gas throughout the container. Dispenser canisters may provide a longer-lasting emission through gradual diffusion, ensuring continuous protection over an extended period. Additionally, canister dispensers may be reused, allowing them to be refilled or replaced. Another important advantage is the reduction of direct contact with the fruit.

Cluster Bags

Cluster bags are perforated plastic bags made from polyethylene (PE) or polypropylene (PP), which allow for adequate airflow while also serving as a protective barrier for individual grape clusters. The incorporation of SBC and citric acid within these bags can be achieved through several methods. One approach is by impregnated film technology, where the plastic film itself is coated with a thin layer of SBC and citric acid, providing a slow and consistent emission of $CO_2$ gas throughout storage and transit. In some examples, the plastic film may be coated with SBC in a range of about 1.5 $mg/cm^2$ to about 15 $mg/cm^2$ and citric acid in a range of about 1.0 $mg/cm^2$ to about 12 $mg/cm^2$. In other implementations, a sachet containing SBC and citric acid embedded within the cluster bag. In this design, a small sachet containing SBC and citric acid granules or powder may be affixed to the inner wall of the bag, typically enclosed in a semi-permeable material that absorbs moisture and gradually releases $CO_2$.

In a further implementation, a dual-layered insert may be used in which the cluster bag is designed with an inner liner that contains a thin sheet infused with SBC and citric acid. This method may provide a controlled and even distribution of $CO_2$ gas over time.

Fruit Coating

Further embodiments, a mixture of SBC and citric acid may be included in a wax-based composition comprising for direct application to fruit or other plant products. The composition may utilize a food-grade shellac, carnauba wax, or paraffin emulsion for a postharvest coating. The SMBS and citric acid may be finely milled and uniformly dispersed within the wax matrix to prevent clumping and ensure even distribution. Upon application, the wax forms a thin, breathable coating on the fruit surface, allowing controlled release of sulfur dioxide ($SO_2$) when exposed to ambient humidity. The coating may provide dual-action protection: a physical barrier against moisture loss and microbial entry, and a chemical barrier via $SO_2$ release to suppress fungal growth and other decay organisms, thereby extending shelf life during cold storage and transit.

Fruit Applications

The combination of SBC and citric acid offers a highly effective carbon dioxide ($CO_2$) release system for preserving various fruits and plant products during storage and shipping. Any of the deployment technologies and delivery systems disclosed herein may be used in in-field packing, cold storage, freight or marine containers in transit and utilized across a wide variety of fruit, vegetables, and plant products. However, different fruits and flowers may have varying sensitivities to $CO_2$, which may benefit from tailored application methods to prevent fungal growth.

For grapes and soft-skinned berries such as raspberries, blackberries, and currants, which are highly susceptible to *Botrytis cinerea* (gray mold), $CO_2$-emitting pads, sachets, or dual-layer strips placed within grape cartons or shipping containers are effective approaches to preserve the fruit. The controlled $CO_2$ release prevents fungal development while maintaining fruit quality. Blueberries, which have delicate skins and a moderate need for fungal protection, benefit from modified atmosphere packaging (MAP) with slow-release $CO_2$ liners or coated films, which prevent dehydration while providing gradual antifungal protection. For strawberries, which are highly perishable and sensitive to $CO_2$, a hydrogel-coated $CO_2$-emitting film or sachets micro-encapsulated granules or powder that release low, gradual $CO_2$ levels may be used to avoid affecting flavor and appearance.

Kiwi, which has moderate fungal susceptibility but is sensitive to high $CO_2$ concentrations, may be protected using buffered $CO_2$-releasing pads placed within cartons or container-mounted dispensers that release $CO_2$ evenly without exceeding preferred exposure levels. For stone fruits such as peaches, plums, cherries, nectarines, and apricots, which are prone to postharvest decay but are highly sensitive to direct $CO_2$ exposure, $CO_2$-releasing coatings or gel-based sprays may be utilized. Hydrogel-coated $CO_2$ films or fine mist paraffin-SBC sprays provide effective fungal control. Similarly, apples and pears, which have low fungal susceptibility but are prone to surface mold, may benefit from sachets or wax-based $CO_2$-releasing sprays that ensure controlled $CO_2$ diffusion.

Tomatoes, which are moderately susceptible to fungal decay but highly sensitive to $SO_2$, the various $CO_2$ delivery mechanisms described herein are effective and an improvement in fruit quality over $SO_2$ fumigation.

For other plant products, such as flowers, which are highly susceptible to fungal infections like *botrytis*, humidity-sensitive $CO_2$ dispensers or granule-based slow-release canisters may provide fungal protection while keeping flowers fresh and vibrant during transport.

By tailoring the $CO_2$-release system to the specific needs of each fruit or plant, the SBC-citric acid composition deployed in particular manner can effectively prevent fungal infections, extends shelf life, and maintains product quality without causing damage. While grapes, currants, and blueberries benefit from direct $CO_2$-emitting sachets, more sensitive fruits like strawberries, stone fruit, and tomatoes require coated films or dispensers to control $CO_2$ release. Selecting a particular delivery method may provide optimal fungal protection and postharvest quality.

The SBC-citric acid composition, deployment technologies, delivery systems, and related methods provide enhanced $CO_2$ release, improving the efficacy of decay control while potentially reducing the overall amount of sodium bicarbonate and citric acid required. By utilizing a controlled-release delivery system, the invention allows for in-field application during packing, reducing reliance on large-scale fumigation processes and mitigating environmental and occupational exposure risks. The combination of SBC and citric acid in a mixture offers several advantages, including:

a. Application during in-field packing to improve disease control ensuring efficient and accelerated carbon dioxide gas production, leading to improved decay control and protection against browning and desiccation of rachis and pedicel tissues in the case of table grapes;
b. Reduction in the total amount of carbon dioxide used without compromising efficacy;
c. Decreased potential for environmental pollution and worker exposure; and
d. Adaptability to existing delivery platforms, such as sachets, box liners, labels, stickers, or impregnated materials, fruit coatings for seamless integration into fresh fruit packaging operations.

This novel approach provides practical and efficient in-field, cold storage, freight and marine container solutions for improving postharvest decay control while minimizing chemical residues and operational challenges associated with traditional $CO_2$ fumigation methods.

It is an object of the present invention to provide a composition including sodium bicarbonate (SBC) and citric acid to provide a more efficient carbon dioxide gas production for the management and control of disease.

It is an object of the present invention to provide a controlled-release $CO_2$ system utilizing a sodium bicarbonate (SBC) and citric acid combination for postharvest fruit preservation.

It is an object of the present invention to provide a moisture-activated $CO_2$-emitting formulation wherein SBC and citric acid are encapsulated within a matrix to ensure gradual carbon dioxide release.

It is an object of the present invention to provide a dual-component $CO_2$ delivery system, wherein SBC and citric acid are coated on a surface to provide controlled gas emission upon humidity exposure.

It is an object of the present invention to provide an $CO_2$-emitting liner or pad incorporating SBC-citric acid composition, ensuring extended $CO_2$ release for shipping and storage applications.

It is an object of the present invention to provide a sprayable $CO_2$-releasing composition, wherein SBC and citric acid in a carrier, enabling spray application to a surface, e.g., in a marine shipping container.

It is an object of the present invention to provide a $CO_2$-emitting sachet or insert with a moisture-permeable membrane, allowing for controlled $CO_2$ generation for shipping and storage applications.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 5 presents a table of data on the natural decay incidence in 'Stella *Bella*' table grapes affected by different postharvest treatments, including 7 g SBC+5 g citric acid, 7 g SBC alone, and an untreated control.

FIG. 6 presents a table of data from field trials evaluating gray mold incidence across seven table grape cultivars, comparing 7 g SBC+5 g citric acid to an untreated control.

FIG. 7 presents a table of data on gray mold incidence in 'Crimson Seedless' table grapes affected by different postharvest treatments, including 7 g SBC+5 g citric acid, and an untreated control.

FIG. 8 presents a table of data on gray mold incidence in 'Flame Seedless' table grapes affected by different postharvest treatments, including 7 g SBC+5 g citric acid, and an untreated control.

DETAILED DESCRIPTION

References will now be made in detail to certain embodiments of the invention, and example compositions and applications of such embodiments. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Example 1—Lab Tests

Figure 1:
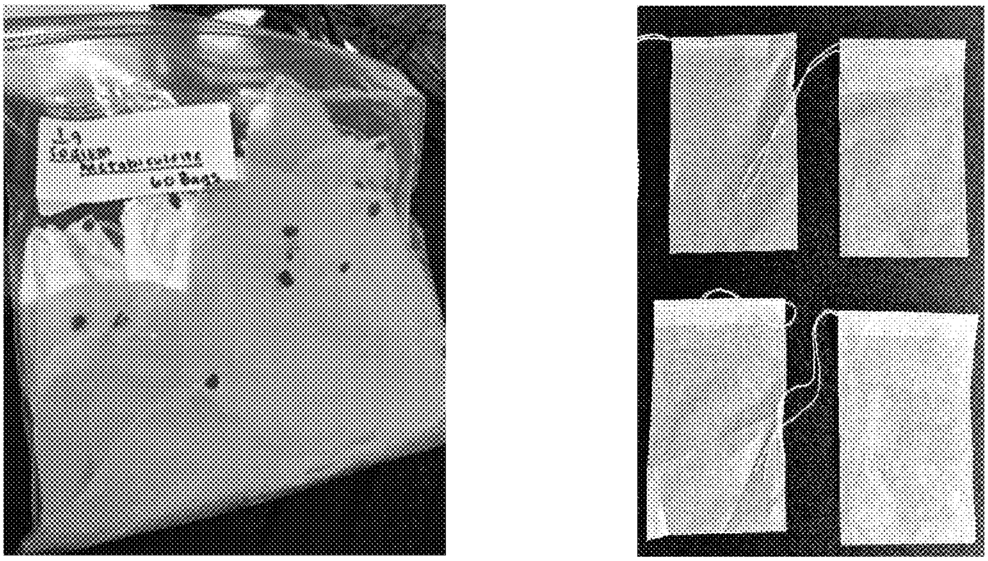
FIG. 1 provides photographs of exemplary sachets according to an embodiment of the present invention, as used in the experimental examples.

The lab studies aimed to evaluate the controlled release of carbon dioxide ($CO_2$) from sodium bicarbonate (SBC) combined with citric acid in sachet-based applications for postharvest grape storage. FIG. 1 shows the sachets used in the experiment, which were disposable NEPAK tea bags (sachet) having dimensions 3.15"L×3.94"W×3.15"H. The primary goal was to determine how different doses of SBC and citric acid affect $CO_2$ emission rates, with a focus on fungal suppression (*Botrytis cinerea*) and rachis preservation under high-humidity conditions.

Figure 2:
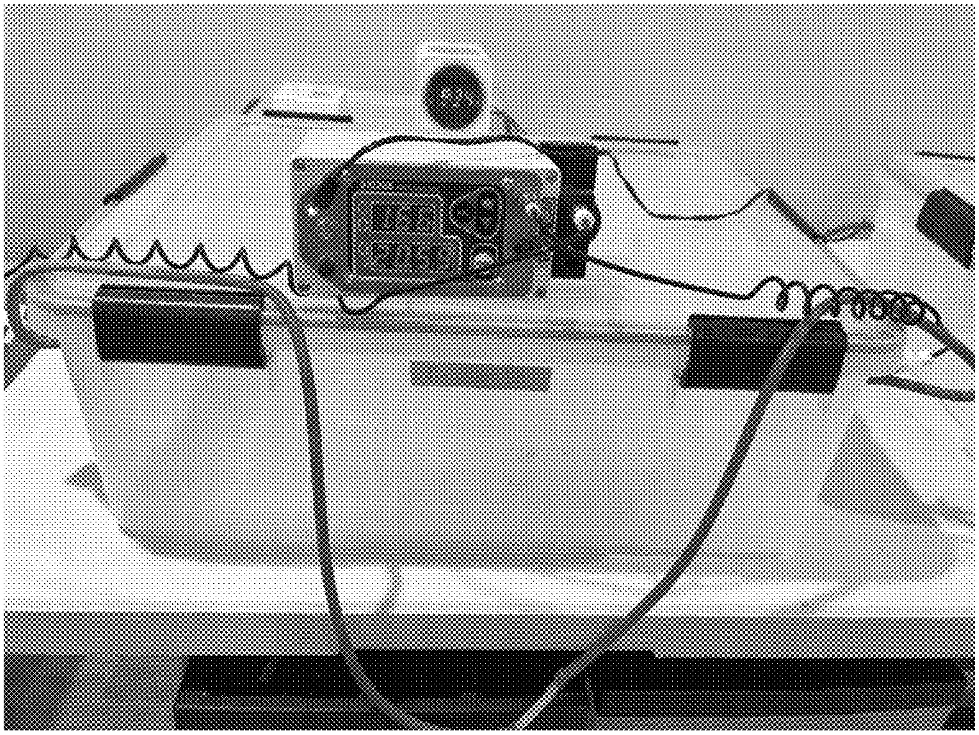
FIG. 2 provides an image of a sealed plastic container system, as used in the experimental examples.

The experiment was conducted in a controlled 20-liter volume sealed plastic box system, simulating commercial fruit storage conditions. The 20-liter box system is shown in FIG. 2. The sealed plastic containers were designed with a sampling inlet and outlet circuit using surgery tubing, from which air was running constantly throughout for $CO_2$ detection without depleting the gas composition inside the container. $CO_2$ levels were assessed with a Horiba VIA-510 infrared gas analyzer. Sachets containing varying doses of SBC and citric acid were placed inside the sealed system, and gas emission data were collected over time.

Figure 3:
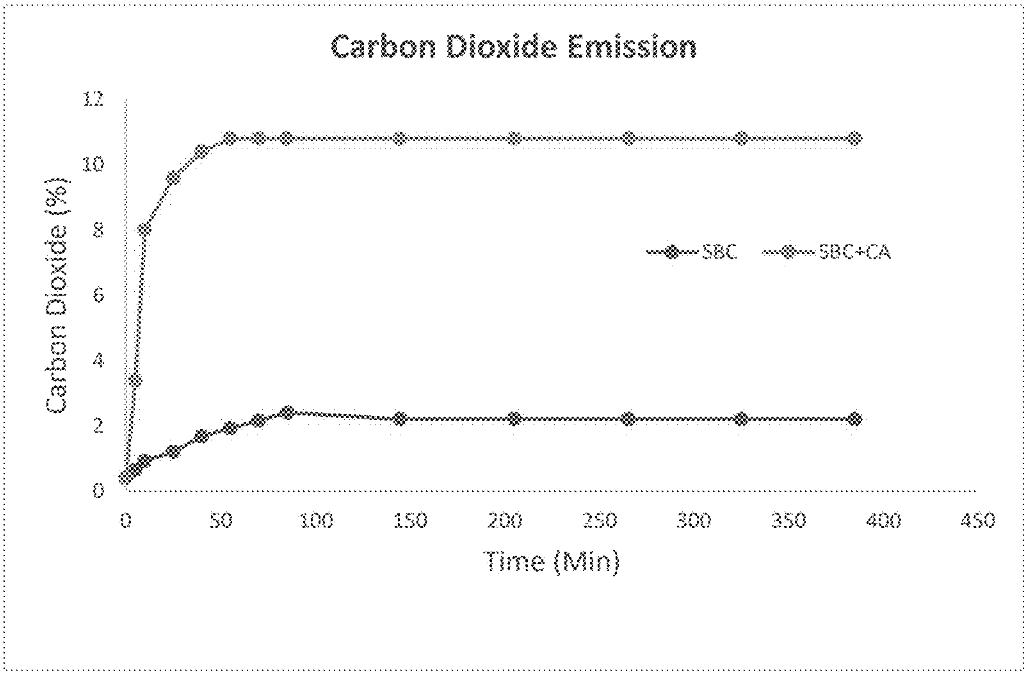
FIG. 3 provides a graph of the accumulated carbon dioxide emission during a laboratory test after applying 7 g sodium bicarbonate (SBC)+5 g citric acid in a table grape container.

The $CO_2$ release profiles for different SBC-citric acid dosages were analyzed over three and half hours following application, with each treatment replicated three times to ensure statistical accuracy and reproducibility. The experimental container was provided with a sachet containing 7 g or SBC mixed with 5 g of citric acid. The control container was provided with a sachet containing 7 g of SBC alone. The containers had a high relative humidity to the ambient air. As shown in FIG. 3, the $CO_2$ production in the experimental container was observed to have a rapid rise in the first ten minutes resulting in the gas within container having about 8% $CO_2$ by volume. The concentration of $CO_2$ then plateaued at about 11%. The container having SBC alone slowly rose to around 2% $CO_2$ gas content over about 100 minutes, and plateaued at that level. The presence of citric acid clearly catalyzed the production of $CO_2$ by a significant amount.

The $CO_2$ release rate is correlated with SBC-citric acid dosage. Higher doses produced immediate and elevated $CO_2$ peaks, whereas lower doses will provide a more gradual and extended release. $CO_2$ concentration may be precisely adjusted based on storage duration, fruit sensitivity, and fungal suppression needs, allowing for customized postharvest protection strategies across different fruit storage and transport conditions.

Field Trials

Field experiments evaluating $CO_2$ emissions from SBC and citric acid sachets, were also conducted to evaluate the effectiveness of these formulations in commercial postharvest table grape storage. The field trials were conducted across two seasons, focusing on red, green, and black table grape cultivars. The primary objective was to determine the impact of SBC with and without a citric acid catalyzer on gray mold (*Botrytis cinerea*) incidence and overall rachis condition during cold storage.

Figure 4:
FIG. 4 provides photographs of packing boxes used for packaging table grapes for field experiments.

The field trials tested the application of carbon dioxide ($CO_2$) from SBC combined with citric acid in sachet-based applications applied immediately after harvest, during standard field packaging in plastic grape boxes (13.0"×19.0"×5.0", or about 20 liters), as shown in FIG. 4. The boxes were then transferred to cold storage (32° F.) within 8 hours. Unlike conventional postharvest treatments that involve weekly sulfur dioxide fumigation, no $SO_2$ applications were made, providing an $SO_2$-free environment to assess the efficacy of the SBC+citric acid sachet application. The experimental setup included four randomized replications per treatment, with sachets containing a pre-measured dry chemical combination of SBC and citric acid sealed in disposable tea bags (3.15"L×3.94"W×3.15"H), as shown in FIG. 1.

Example 2-Natural Decay in 'Stella *Bella*' Table Grape

Decay incidence was evaluated at four weeks of cold storage, based on visible mycelial growth or slip-skin symptoms, with results expressed as decay incidence by weight. Statistical significance was assessed using Tukey's test at a 5% probability level to determine treatment differences.

FIG. 5 presents the natural decay incidence in 'Stella *Bella*' grapes from the 2022 season, comparing SBC alone (7 g), SBC+citric acid (7 g+5 g), and an untreated control. The SBC+citric acid treatment significantly reduced gray mold incidence (12%), equating to an 88% reduction relative to the untreated control (100%). The 7 g SBC-only treatment also showed a significant reduction (32%), but was still significantly less effective than the SBC+citric acid combination. These results indicate that citric acid plays a crucial role as a catalyzer, enhancing the efficacy of SBC by promoting faster and sustained $CO_2$ release.

Regarding rachis condition, the SBC+citric acid treatment received a score of 2-3, indicating moderate rachis preservation compared to 3-4 rating which is more severe *botrytis* damage in the untreated and SBC-only treatments. This suggests that $CO_2$ exposure from SBC+citric acid may slow rachis desiccation, likely by reducing oxidative stress and fungal colonization.

Example 3—Gray Mold in Seven Table Grapes

FIG. 6 provides field trial data on gray mold incidence in seven different table grape cultivars from the 2023 season, comparing 7 g SBC+5 g citric acid to an untreated control after four weeks of storage. Across all cultivars, the SBC+citric acid treatment significantly reduced gray mold, with relative reductions ranging from 75.7% to 98.4%. The greatest effect was observed in 'Scarlet Royal' (98.4% reduction), followed by 'Thompson Seedless' (96.5%) and 'Flame Seedless' (94.3%). Even in cultivars with lower baseline gray mold incidence, such as 'Allison' and 'Redglobe', the treatment still resulted in high relative reductions (87.1% and 75.7%, respectively).

These findings reinforce the broad efficacy of SBC+citric acid sachets across multiple grape varieties, suggesting that $CO_2$ release mechanisms are effective regardless of cultivar-specific susceptibility to *Botrytis cinerea*. The statistical significance of these reductions was confirmed by Tukey's test ($p<0.05$), indicating that the observed differences were not due to random variation.

Example 4—Natural Decay in 'Crimson Seedless" Table Grape

FIG. 7 presents the natural decay incidence in 'Crimson Seedless' grapes from the 2024 season, comparing SBC alone (7 g), SBC+citric acid (7 g+5 g), and an untreated control. The SBC+citric acid treatment significantly reduced gray mold incidence (9.8%), equating to an 90.2% reduction relative to the untreated control (100%).

Regarding rachis condition, the SBC+citric acid treatment received a score of 2-3, indicating moderate rachis preservation compared to 3-4 in the untreated and SBC-only treatments. This suggests that $CO_2$ exposure from SBC+citric acid may slow rachis desiccation, likely by reducing oxidative stress and fungal colonization.

Example 5—Natural Decay in 'Flame Seedless" Table Grape

FIG. 8 presents the natural decay incidence in 'Flame Seedless' grapes from the 2024 season, comparing SBC alone (7 g), SBC+citric acid (7 g+5 g), and an untreated control. The SBC+citric acid treatment significantly reduced gray mold incidence (41%), equating to an 59% reduction relative to the untreated control (100%).

Regarding rachis condition, the SBC+citric acid treatment received a score of 2-3, indicating moderate rachis preservation compared to 3-4 in the untreated and SBC-only treatments. This suggests that $CO_2$ exposure from SBC+citric acid may slow rachis desiccation, likely by reducing oxidative stress and fungal colonization.

The field data show improved preservation and health where the combination of SBC and citric acid are present in storage containers. This demonstrates the catalyzing effect of citric acid enhances $CO_2$ production, leading to greater fungal suppression and improved rachis preservation. The consistent reductions in gray mold incidence across multiple grape cultivars demonstrate the broad-spectrum effectiveness of this approach in postharvest table grape management.

From a commercial perspective, these findings suggest that integrating SBC+citric acid sachets or in other delivery mechanisms into standard packaging could provide a viable alternative to $SO_2$ fumigation, particularly in organic cold storage systems where conventional fumigation is restricted. The treatment's proven efficacy in reducing gray mold makes it an attractive option for long-distance fruit shipments, ensuring fungal suppression and prolonged fruit quality during extended storage and transport. Additionally, the positive impact on rachis condition suggests that this formulation may enhance the visual appeal of fruit.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A system for deploying a carbon dioxide ($CO_2$)-generating composition in harvesting containers, storage containers, and shipping containers, comprising:

a. a composition comprising sodium bicarbonate (SBC) and citric acid in a ratio of about 7 parts SBC to about 5 parts citric acid, said composition being configured to react upon exposure to moisture to release $CO_2$ gas; and b. a deployment mechanism that houses or incorporates the composition and is configured to be placed in a transport container for freshly harvested whole produce, wherein the deployment mechanism is configured to allow the release of $CO_2$ gas within the transport container to prevent fungal growth, wherein said citric acid accelerates the rate of $CO_2$ production by a factor of at least two within one hour of deployment in said transport container.

2. The system of claim 1, wherein the deployment mechanism comprises a sachet containing a measured amount of the composition enclosed in a moisture-permeable material.

3. The system of claim 1, wherein the deployment mechanism comprises a sheet or pad impregnated with the composition and enclosed within a composite material consisting of plastic and paper.

4. The system of claim 1, wherein the deployment mechanism comprises a microencapsulated formulation embedded within a moisture-sensitive coating selected from hydroxypropyl methylcellulose, alginate, or starch-based materials.

5. The system of claim 1, wherein the deployment mechanism comprises a box liner label, wherein the composition is incorporated into an adhesive-backed or non-adhesive liner positioned inside the shipping container.

6. The system of claim 1, wherein the deployment mechanism is configured to maintain a $CO_2$ concentration of 50,000-400,000 ppm within the shipping container for at least four weeks.

7. The system of claim 1, wherein the deployment mechanism includes a moisture-activated release barrier to prevent premature activation.

8. A system for deploying a carbon dioxide ($CO_2$)-generating composition in harvesting containers, storage containers, and shipping containers, comprising:

a. a composition comprising sodium bicarbonate (SBC) and citric acid in a ratio of about 7 parts SBC to about 5 parts citric acid, said composition being configured to react upon exposure to moisture to release $CO_2$ gas at an accelerated rate; and b. a deployment mechanism that houses or incorporates the composition and is configured to be placed in a transport container for freshly harvested whole produce, wherein the deployment mechanism is configured to allow the release of $CO_2$ gas within the transport container to prevent fungal growth, wherein said citric acid accelerates the rate of $CO_2$ production by a factor of at least two within said transport container.

9. The system of claim 8, wherein the deployment mechanism comprises a sachet containing a measured amount of the composition enclosed in a moisture-permeable material.

10. The system of claim 8, wherein the deployment mechanism comprises a sheet or pad impregnated with the composition and enclosed within a composite material consisting of plastic and paper.

11. The system of claim 8, wherein the deployment mechanism comprises a microencapsulated formulation embedded within a moisture-sensitive coating selected from hydroxypropyl methylcellulose, alginate, or starch-based materials.

12. The system of claim 8, wherein the deployment mechanism comprises a sprayable dispersion, wherein the composition is suspended in a sprayable carrier, wherein the sprayable carrier is selected from paraffin wax, carnauba wax, lecithin, hydroxypropyl methylcellulose, or alginate hydrogel.

13. The system of claim 8, wherein the deployment mechanism is configured to maintain a $CO_2$ concentration of 50,000-400,000 ppm within the shipping container for at least four weeks.

14. A system for deploying a carbon dioxide ($CO_2$)-generating composition in harvesting containers, storage containers, and shipping containers, comprising:

a. a composition comprising sodium bicarbonate (SBC) and citric acid in a ratio of about 7 parts SBC to about 5 parts citric acid, said composition being configured to react upon exposure to moisture to release $CO_2$ gas at an accelerated rate; and b. a deployment mechanism that houses or incorporates the composition and is operable to be placed in a transport container for freshly harvested whole produce, wherein the deployment mechanism is configured to allow the release of $CO_2$ gas within the transport container to prevent fungal growth.

15. The system of claim 14, wherein the deployment mechanism is configured to maintain a $CO_2$ concentration of 50,000-400,000 ppm within the shipping container for at least four weeks.

16. The system of claim 14, wherein the deployment mechanism comprises a sachet containing a measured amount of the composition enclosed in a moisture-permeable material.

17. The system of claim 14, wherein the deployment mechanism comprises a sheet or pad impregnated with the composition and enclosed within a composite material consisting of plastic and paper.

18. The system of claim 14, wherein the deployment mechanism comprises a microencapsulated formulation embedded within a moisture-sensitive coating selected from hydroxypropyl methylcellulose, alginate, or starch-based materials.

19. The system of claim 1, wherein the freshly harvested whole produce is grapes, and the $CO_2$ production improves rachis score in the grapes.

20. The system of claim 1, wherein the freshly harvested whole produce is grapes, and the $CO_2$ production reduces gray mold incidence in the grapes by at least 75%.

* * * * *